US012109500B2

(12) United States Patent
Monti et al.

(10) Patent No.: US 12,109,500 B2
(45) Date of Patent: Oct. 8, 2024

(54) VIDEO RECORDING SYSTEM AND METHOD

(71) Applicant: Sony Interactive Entertainment Inc., Tokyo (JP)

(72) Inventors: Maria Chiara Monti, London (GB); Hugh Alexander Dinsdale Spencer, London (GB); Maurizio Cerrato, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 114 days.

(21) Appl. No.: 17/718,468

(22) Filed: Apr. 12, 2022

(65) Prior Publication Data

US 2022/0331704 A1 Oct. 20, 2022

(30) Foreign Application Priority Data

Apr. 15, 2021 (GB) ...................................... 2105366

(51) Int. Cl.
*A63F 13/86* (2014.01)
*A63F 13/49* (2014.01)

(52) U.S. Cl.
CPC .............. *A63F 13/86* (2014.09); *A63F 13/49* (2014.09); *A63F 2300/577* (2013.01); *A63F 2300/634* (2013.01)

(58) Field of Classification Search
CPC .... A63F 13/86; A63F 13/49; A63F 2300/577; A63F 2300/634
See application file for complete search history.

(56) References Cited

U.S. PATENT DOCUMENTS

| 6,699,127 | B1 * | 3/2004 | Lobb ....................... A63F 13/45 463/43 |
| 2008/0268961 | A1 * | 10/2008 | Brook ................... A63F 13/497 463/42 |

(Continued)

FOREIGN PATENT DOCUMENTS

GB 2557976 A 7/2018

OTHER PUBLICATIONS

Extended European Search Report for corresponding EP Application No. 22167934.3, 10 pages, dated Sep. 9, 2022.

(Continued)

*Primary Examiner* — Reginald A Renwick
(74) *Attorney, Agent, or Firm* — Matthew B. Dernier, Esq.

(57) ABSTRACT

A method of recording a seamless customised video recording of a video game, the method comprising the steps of: video recording a first run-through of at least a part of the video game; saving a saved-game state of a first game state of the video game, the saved-game state enabling a game state of the video game to be reset to the saved-game state that is at least visually identical to the first game state; detecting, in response to the saving of the saved-game state, a time within the video recording of the first run-through corresponding to the time the saved-game state is saved; video recording, when the game state is reset to the saved-game state, another run-through from the saved-game state; and editing the video recording of the first run-through by replacing some or all the video recording of the first run-through recorded from the detected time with the video recording of the other run-through when the other run-through meets a predetermined preference criterion.

15 Claims, 7 Drawing Sheets

(56) References Cited

U.S. PATENT DOCUMENTS

2009/0258708 A1\* 10/2009 Figueroa ................. A63F 13/45
                                                              463/43
2015/0128048 A1   5/2015 Moffatt
2015/0375102 A1  12/2015 George
2017/0087460 A1\*  3/2017 Perry .................... A63F 13/497
2020/0197821 A1   6/2020 Benedetto

OTHER PUBLICATIONS

Combined Search and Examination report for corresponding GB Application No. GB2105366.5, 9 pages, dated Oct. 18, 2021.

\* cited by examiner

VIDEO RECORDING SYSTEM AND METHOD

BACKGROUND OF THE INVENTION

Field of Invention

The present invention relates to a system and method for recording a seamless customised video recording of a video game.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

As the popularity of video games has increased, the popularity of users of video games recording a video recording their gameplay and then sharing video content comprising portions of these video recordings for others to watch has also grown.

There are many different types of video content that users may create, with each type requiring a varying level of time and skill to create in both a recording stage and an editing stage.

For example, a user may create video content by livestreaming their gameplay directly. This type of video content does not generally require any editing to be performed, as a video recording of the user's gameplay is broadcast live or with a slight delay. However, the popularity of this type of video content is often based on the personality of the user livestreaming the video content instead of the gameplay of the video game. Furthermore, as the livestream is unedited, it may include many repetitions of sections of the video game due to the user failing to progress in the video game. These sections may be undesirable for those that want to watch the gameplay of the video game.

Video walkthroughs are another example of a type of video content that may be created by users. A video walkthrough is an instructive type of video content that can teach other users how to perform tasks or complete objectives in a video game, or even how to complete an entire video game from start to finish.

Due to the instructive nature of a video walkthrough, video walkthroughs typically do not include video content that shows the creator of the video walkthrough failing to progress in the video game. Therefore, unless the creator of a video walkthrough is incredibly skilled or lucky, the creator of the video walkthrough will often have to record a video of multiple attempts, or run-throughs, of a section of a video game until the creator of the video walkthrough successfully progresses through the section of the video game.

The creator of the video walkthrough would then have to spend time and effort editing the video recording in order to remove their unsuccessful attempts to create a video walkthrough. Additionally, the creator of the video walkthrough may not be proficient in video editing, which may result in visibly jarring cuts and transitions between different run-throughs, or prevent their ability to produce a suitable video at all.

It is in this context that the present disclosure arises.

SUMMARY OF THE INVENTION

In a first aspect, a method of recording a seamless customised video recording of a video game is provided in the description herein. In another aspect, a recording system for recording a seamless customised video recording of a video game is provided in the description herein.

Further respective aspects and features of the invention are defined in the appended claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

With the ever increasing number of users that want to create customised video content based on video recordings of their run-throughs of video games, it is desirable to provide a video recording system and method that may advantageously enable a user to record a seamless customised video recording of a video game.

Figure 1:
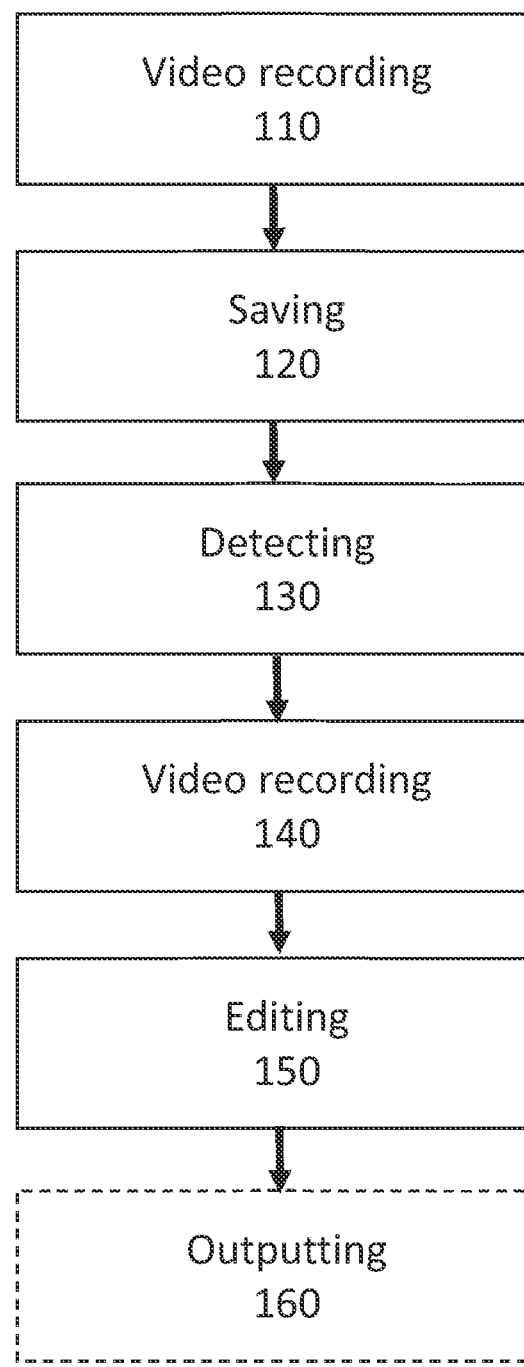
FIG. 1 schematically illustrates a flowchart of a video recording method.

Accordingly, turning now to FIG. 1, in some embodiments of the present disclosure, a method of recording a seamless customised video recording of a video game is provided. The method comprises the steps of video recording 110 a first run-through of at least a part of the video game; saving 120 a saved-game state of a first game state of the video game part-way through the first run-through, the saved-game state enabling a game state of the video game to be reset to the saved-game state that is at least visually identical to the first game state; detecting 130, in response to the saving of the saved-game state, a time within the video recording of the first run-through corresponding to the time the saved-game state is saved; video recording 140, when the game state is reset to the saved-game state, another run-through from the saved-game state; and editing 150 the video recording of the first run-through by replacing some or all of the video recording of the first run-through recorded from the detected time with the video recording of the other run-through when the other run-through meets a predetermined preference criterion.

Figure 2A:
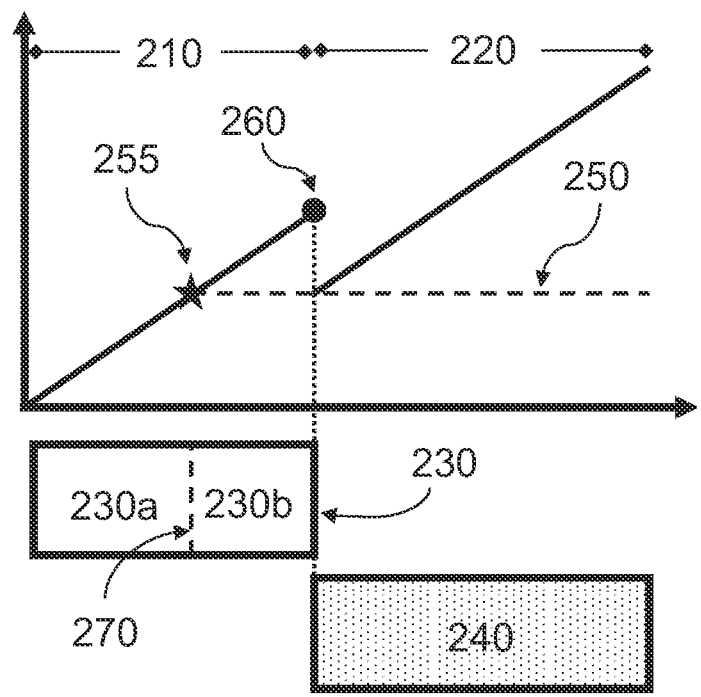
FIGS. 2A and 2B schematically illustrate stages of a video recording method.
Figure 2B:
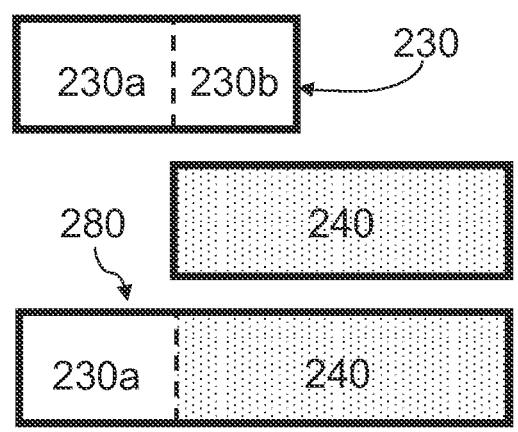

FIGS. 2A and 2B illustrate an example of some embodiments of the present disclosure. The graph in FIG. 2A shows a user's progress in a video game, represented by the y-axis, against time, represented by the x-axis, when the user is intending to record a seamless customised video recording of the video game. In FIG. 2A and similarly FIGS. 3A, 4A and 5A, the user's progress during a run-through 210, 220 of at least part of a video game generally increases at a linear rate over time. It will be noted that the linear rate of progress is shown in these figures to merely provide context to the features of the present disclosure. A user's progress may not be linear and may not always increase. Furthermore, no measurement of a user's progress is required to implement the embodiments of the present disclosure; the user's progress is only shown to provide a reference for discussing various features of the present disclosure.

In FIG. 2A, a video recording 230 of a first run-through 210 of at least a part of the video game is shown underneath the graph. A saved-game state 250 of a first game state 255 of the video game is saved during the first run-through 210, i.e. part-way through the first run-through. The saved-game state enables a game state of the video game to be reset 260 to the saved-game state 250 that is at least visually identical to the first game state 255. In response to saving the saved-game state 250, a time 270 within the video recording of the first run-through is detected. As shown in FIG. 2A, the detected time 270 within the video recording corresponds to the time within the first run-through where the saved-game state 250 is saved.

At the end of the first run-through 210, the game state is reset 260 to the saved game state 250. The reset 260 may be initiated manually by the user or it may be in response to satisfying one or more predetermined reset conditions occurring during the first run-through 210. For example, the one or more predetermined reset conditions may be any one the following conditions: a user's avatar's hit points or health are at or below zero, an in-game timer reaches zero, an in-game objective is failed, or any other suitably chosen predetermined reset condition.

Another run-through 220 starts from the saved-game state 250 that is at least visually identical to the first game state 255. In FIG. 2A a video recording 240 of the other run-through 220 from the saved-game state is shown underneath the graph. The vertical displacement between the two video recordings 230 and 240 in FIG. 2A is merely shown to clearly illustrate the two video recordings.

FIG. 2B illustrates an example of the editing 150 step of the method of FIG. 1 using the two video recordings 230 and 240. The video recording 230 of the first run-through may be edited by replacing the video recording of the first run-through, for example from the detected time 230*b* with the video recording 240 of the other run-through when the other run-through meets a predetermined preference criterion.

Referring to FIG. 2A, if the other run-through 220 does not meet the predetermined preference criterion, the editing step may not replace any of the video recording 230 of the first run-through 210 with the video recording 240 of the other run-through 220. In this case, the video recording 240 of the other run-through 220 may be discarded or saved as a separate video recording.

However, in the example provided in FIG. 2B, the other run-through 220 meets the predetermined preference criterion. Therefore, the video recording of the first run-through from the detected time 230*b* is replaced by the video recording 240 of the other run-through 220*b*. The edited video 280 is shown at the bottom of FIG. 2B, and comprises the video recording of the first run-through prior to the detected time 230*a* and the video recording 240 of the other run-through from this time. As the start of the video recording 240 of the other run-through is visually identical to the start of the video recording of the first run-through from the detected time 230*b*, there is no visible indication in the edited video that the edited video comprises video recordings 230*a* and 240 of a plurality of run-throughs 210 and 220.

In some embodiments of the present disclosure, the method may comprise a step of identifying a first frame from the video recording of the first run-through after the detected time and a second frame from the video recording of the other run-through based on a perceptual image comparison metric. The perceptual image comparison metric may be a metric that describes a degree of similarity between image frames. In these embodiments, the editing step comprises replacing the video recording of the first run-through after the first identified frame with the video recording of the other run-through from the second identified frame when the other run-through meets a predetermined preference criterion.

The difference between the first identified frame and the second identified frame may be reduced by inserting interpolation frames between the first identified frame and the second identified frame. The interpolation frames may be generated by a machine learning algorithm that is trained to generate the interpolation frames based on a training data set comprising a plurality of pairs of image frames, where a perceptual image comparison metric of each pair of image frames of the training data is less than a predetermined threshold.

It will be appreciated that in principle the very first frame at the save point will be identical and hence is effectively guaranteed to meet the perceptual image comparison metric (threshold). Hence if the system reviewed frames running forward from the save point, it would be likely to select the first frame as the best match. However, if the system reviews frames running backward from the end of the first run through (or from a predetermined point beforehand), then frames that meet the perceptual image comparison metric are likely to be those frames immediately preceding the divergence between the second run and the first (truncated or unsatisfactory) run. Optionally after finding a frame that meets the perceptual image comparison metric, the system can track further backward through the frames (for example by a threshold number) to find any maximum in the metric, and preferentially use that frame.

Optionally metadata relating to the virtual camera position, and further optionally its direction, can be recorded alongside the video frames; consequently frames can be compared first on the basis of relative camera position and further optionally direction to find portions of the respective recorded runs that are most likely to align visually (e.g. due to the respective virtual cameras being within a first threshold distance of each other, and further optionally within a second threshold direction of each other). In this case only those frames sufficiently aligned by location and further optionally by direction are then analysed further to generate the perceptual image comparison metric.

The perceptual image comparison metric may use any suitable image matching scheme.

Figure 7A:
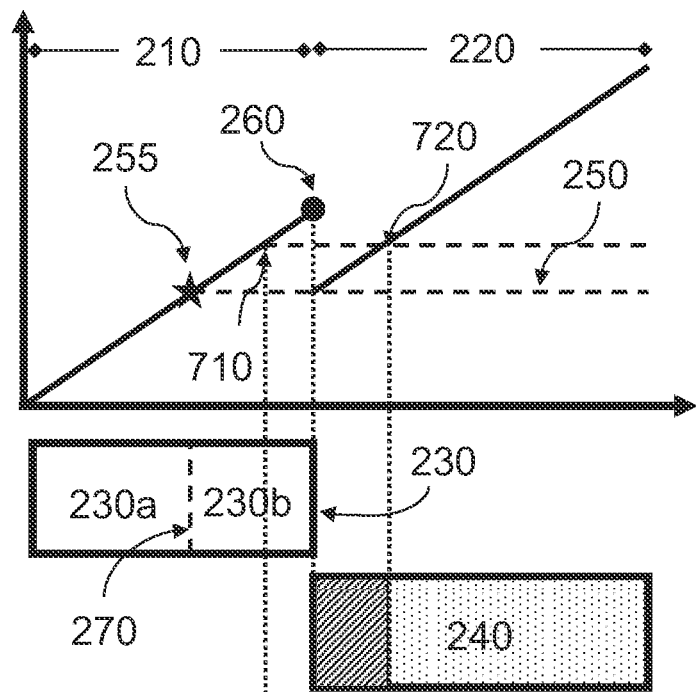
FIGS. 7A and 7B schematically illustrate stages of a video recording method.
Figure 7B:
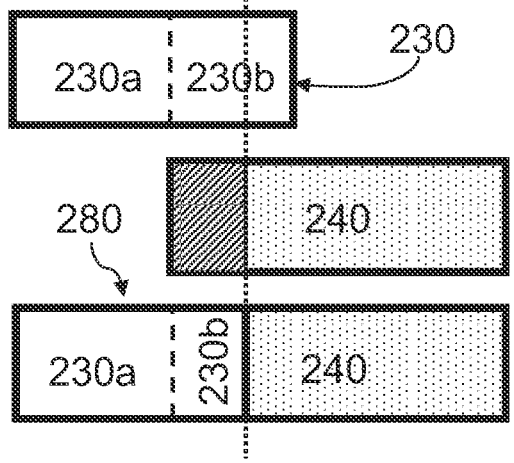

This is illustrated in FIGS. 7A and 7B, wherein like reference numerals to those of FIGS. 2A and 2B designate identical or corresponding parts; frames from the video recording 230*b* of the first run-through have been compared with frames of the video recording 240 of the second run-through to generate the perceptual image comparison metric, optionally firstly based on within-tolerance collocation of camera position and further optionally within-tolerance camera direction, and in this explanatory example a sufficient and optionally maximal match has been identified between the frame for moment 710 in the first recording, and the frame for moment 720 in the second recording.

Accordingly, the second recording 240, from the frame for moment 720, is appended to the first recording 230b after the frame for moment 710, to create the edited video 280. It will be appreciated that the sufficiently matching frame used in the edited video may come from either recording.

Similarly, any blending operations between the versions of the frame in the respective recordings may optionally be applied to this frame and further optionally to a predetermined number of frames one or both sides of it. Such blending and/or frame interpolation may use any suitable technique, including a technique where a gap or difference between the two frames is filled by a deep learning super sampling machine learning algorithm or the like trained to perform frame interpolation, for example over a series of N frames where N is in the range from 1 to a predetermined number of frames.

It will be appreciated that the above image-based approach for defining an edit point may be used as appropriate, alternatively or in addition to defining the edit point as when the game state was saved, in the embodiments described herein.

For example, in some games resources, non-player characters or other game features respawn after a save point or a checkpoint, and so the game will play out potentially identically on a second run-through. In other games, some resources, non-player characters, or other game features are treated as having already been encountered on a second run-through. Consequently in some games, in order to provide the illusion of success on a first run-through, and also inform other users of what to expect on such a run-through, it is preferable to edit the video at a point of divergence of outcome within the first and second run-throughs rather than edit the video back to the save point or checkpoint.

Optionally the user can be given the choice of which of two edit points to use (back to a save point or check point, or back to a matching image point), for example during a pause in gameplay.

Figure 3A:
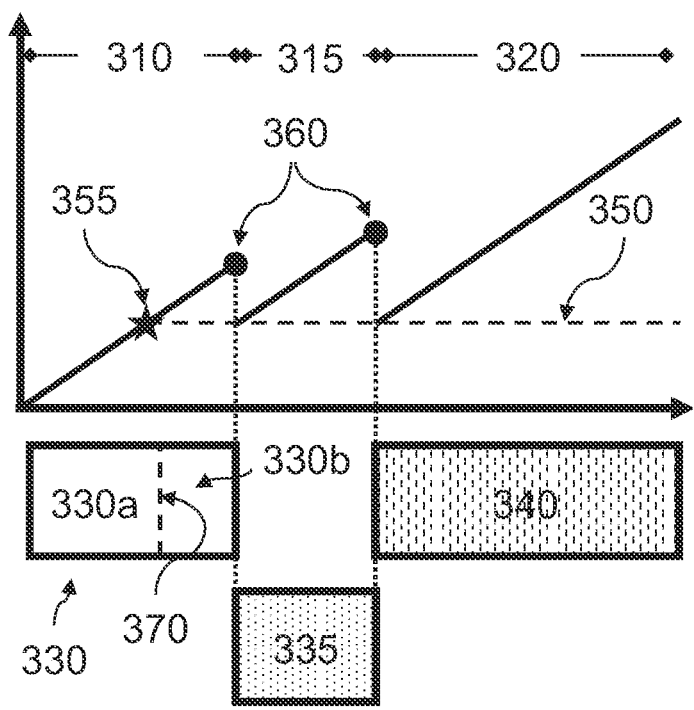
FIGS. 3A to 3C schematically illustrate stages of a video recording method.
Figure 3B:
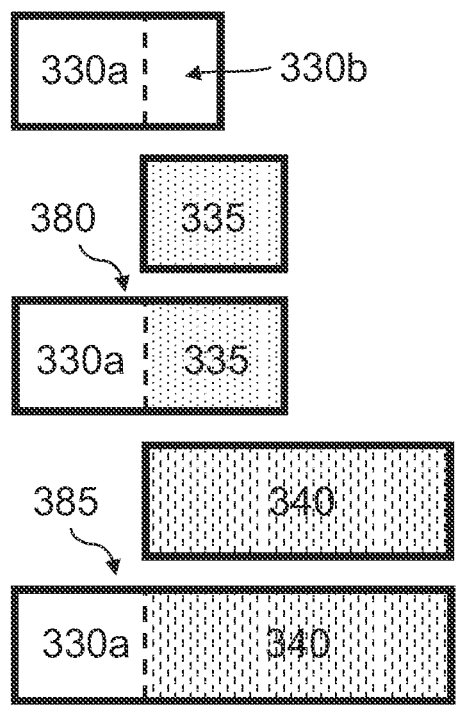
Figure 3C:
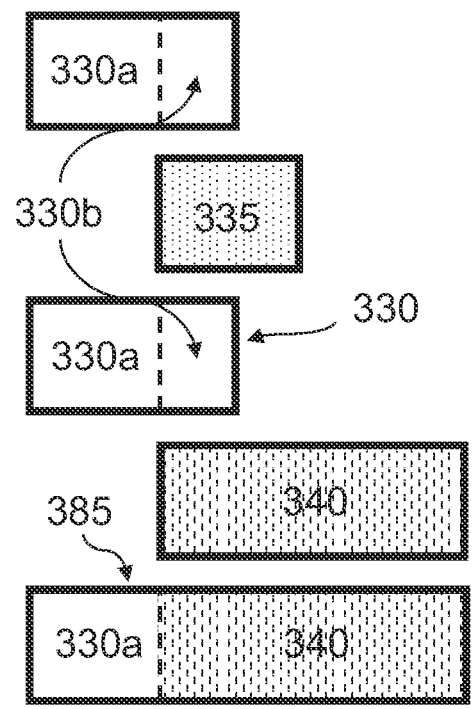

Turning now to FIGS. 3A, 3B and 3C, these figures are similar to FIGS. 2A and 2B. Therefore, where portions of FIGS. 3A, 3B and 3C reflect portions of FIGS. 2A and 2B that have already been discussed above, a lengthy discussion of these portions of the figures will be omitted.

FIG. 3A provides an example of some embodiments of the present disclosure, and differs from FIG. 2A in the number of run-throughs 310, 315 and 320 that are shown. FIG. 3A shows a first run-through 310, and a first and a second other run-through 315 and 320. Likewise, FIG. 3A also shows a video recording 330, 335, and 340 for each respective run-through.

For brevity, the description will use the term "first video recording" when referring to the video recording of the first run-through, the term "second video recording" when referring to the video recording of the first other run-through, and the term the term "third video recording" when referring to the video recording of the second other run-through.

FIGS. 3B and 3C each illustrate an example of the editing step of the method of FIG. 1. Turning first to FIG. 3B, in this example both the first other run-through 315 and the second other run-through 320 meet the predetermined preference criterion.

The predetermined preference criterion may be based on one or more of a number of different metrics, for example, an in-game score, a number of in-game enemies defeated, a number of in-game items collected, an amount of damage the user's avatar takes during the run-through, a specific in-game enemy being defeated, or any other suitable metric for comparing different run-throughs.

In some embodiments, the predetermined preference criterion may only be met for another run-through if the one or more metrics of the other run-through are higher, or lower such as the amount of damage the user's avatar takes during the run-through, than the one or more metrics of the run-through of the video recording to be edited.

Returning to FIG. 3B, the first video recording after the detected time 330b is replaced by the second video recording 335 to create a first edited video 380. In some embodiments, this part of the editing step may be performed after the second reset 360 but prior to the start of the second other run-through 320. Then, after the second other run-through 320 is completed, a second step of editing may be performed. In this case, as the first video recording 330 has already been edited, the second editing step may performed on the first edited video 380 instead of the first video recording 330. However, in some other embodiments of the present disclosure, the editing may be performed in one step after all of the run-throughs have been video recorded.

In the example shown in FIG. 3B, the second other run-through 320 meets the predetermined preference criterion. Therefore, the edited video after the detected time 335, which in this example is the second video recording 335, is replaced by the third video recording 340 to create a second edited video 385.

Whilst not shown in FIG. 3B, if the second other run-through 320 does not meet the predetermined preference criterion, the editing step may not replace any of the edited video after the detected time 335 with the third video recording 340. In this case, the third video recording 340 may be discarded or saved as a separate video recording.

Turning now to FIG. 3C, in this example, the first other run-through does not meet the predetermined preference criterion, whilst the second other run-through does meet the predetermined preference criterion.

The editing step or steps shown in FIG. 3C, whilst similar to those shown in FIG. 3B, does not replace any of the first video recording 330 with the second video recording 335, as the first other run-through 315 does not meet the predetermined preference criterion in this example. In this example, the second video recording 335 may be discarded or saved as a separate video recording. However, as the second other run-through 320 does meet the predetermined performance criterion, the first video recording after the detected time 330b is replaced by the third video recording 340 to create an edited video 385.

Although the editing steps shown in FIGS. 3B and 3C differ due to whether the first other run-through 315 met the predetermined preference criterion, the final edited video is the same in both cases, as, in this example, either the second video recording 335 is completely replaced by the third video recording 340 or the second video recording 335 is never included in the edited video.

Figure 4A:
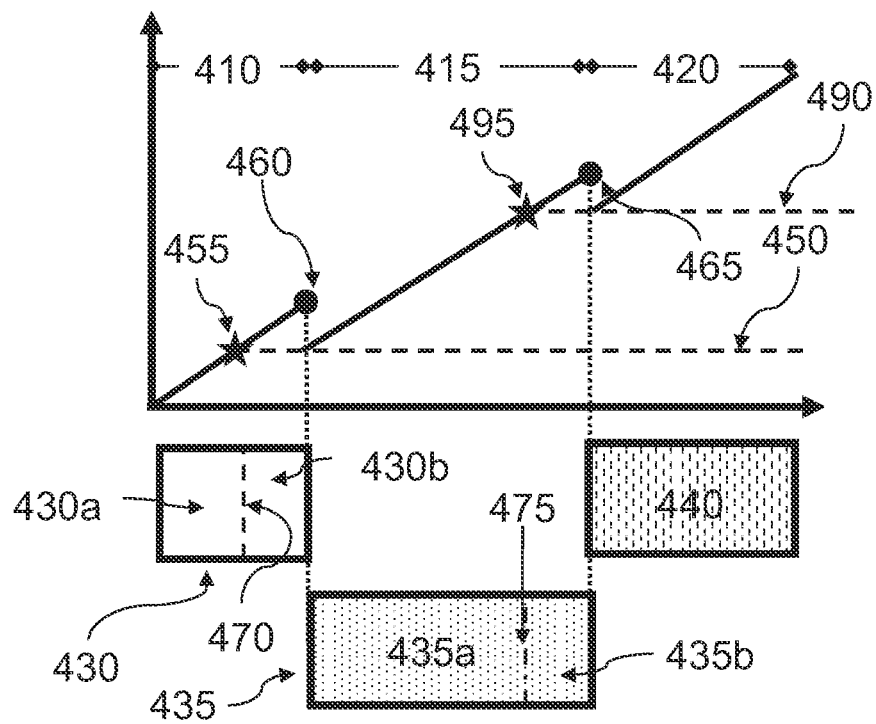
FIGS. 4A and 4B schematically illustrate stages of a video recording method.
Figure 4B:
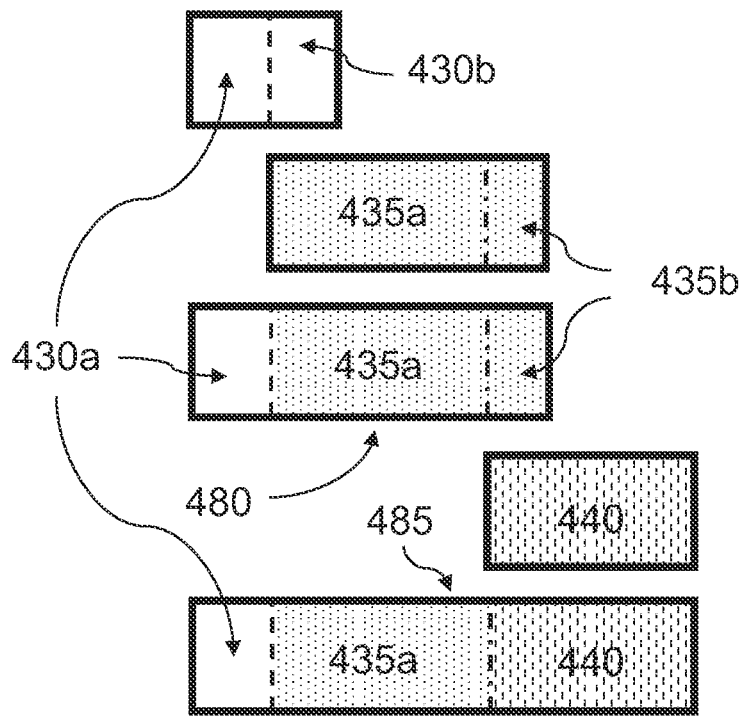

Turning now to FIGS. 4A and 4B, similarly to FIGS. 3A, 3B and 3C, where features of FIGS. 4A and 4B reflect features of other figures that are described elsewhere herein, repeated description of these features will be omitted.

FIG. 4A shows a first run-through 410, a first other run-through 415 and a second other run-through. FIG. 4A illustrates an example where a first saved-game state 450 of a first game state 455 of the video game is saved during the first run-through 410, as described elsewhere herein, and a second saved-game state 490 of a second game state 495 of the video game is saved during the first other run-through 415. The second saved-game state 490 enables a game state of the video game to be reset 465 to the second saved-game state 490 that is at least visually identical to the second game state 495. In the example shown in FIG. 4A, the second other run-through 420 starts from the second saved-game state 490.

In response to saving the first saved-game state 450, a first time 470 within the first video recording 430 is detected. As shown in FIG. 4A, the first detected time 470 within the first video recording 430 corresponds to the time within the first run-through 410 where the first saved-game state 450 is saved. Similarly, in response to saving the second saved-game state 490, a second time 475 within the second video recording 435 is detected. As shown in FIG. 4A, the second detected time 475 within the second video recording 435 corresponds to the time within the first other run-through 415 where the second saved-game state 490 is saved.

FIG. 4B illustrates an example of the editing step of the method of FIG. 1 applied to the three video recordings 430, 435 and 440 shown in FIG. 4A. In the example of FIG. 4B, both the first other run-through 415 and the second other run-through 420 meet the predetermined preference criterion.

In this example, the first video recording after the first detected time 430b is replaced by the second video recording 435 to create a first edited video 480. The first edited video after the second detected time 335b is replaced by the third video recording 340 to create a second edited video 485.

Whilst this example shows the editing being performed sequentially, the editing may be performed based on all three video recordings concurrently, or the editing may be performed first on the second video recording 435 and third video recording 440 to create a first edited video, and then performed on the first edited video and the first video recording 430.

Whilst not shown in FIG. 4B, if the first other run-through 415 does not meet the predetermined preference criterion, the editing step may not replace any of the first video recording after the first detected time 430b with the second video recording 435. In this case, the third video recording 440 may not be used in the editing step as it will not seamlessly join with the first video recording 430. In this case, both the second video recording 435 and the third video recording 440 may be discarded or saved as a separate video recordings.

In some embodiments of the present disclosure, the method may further optionally provide, as indicated by the dotted outline of step 160 in FIG. 1, a step of outputting 160 the edited video recording. For example, the edited video may be output to a storage device, a display device, a video sharing platform, or any other suitable output destination.

In some embodiments of the present disclosure, a saved-game state of a first game state may enable the game state to be reset to the saved-game state that is identical to the first game state. In these embodiments, resetting the game state to the saved-game state would fully reset the game state to be identical to the first game state. For example, all of a user's avatar's experience points would be reset to the same value that the user's avatar's experience points were at the first game state, the user's inventory would be reset to be the same as the user's inventory at the first game state, in-game items that were in a non-collected state (i.e. had not been collected by the user) at the first game state would be reset to the non-collected state.

In some embodiments of the present disclosure, the option to save a saved-game state of a first game state that enables the game state to be reset to the saved-game state that is identical to the first game state may only be accessible when the video game is run in a video recording mode. The recording mode may therefore advantageously enable the embodiments of this disclose to be used with games that are not designed to have a save-game feature, such as games that use respawning or checkpoints as a mechanic.

As a difficulty level of a video game may be designed based on checkpoints or respawning, in-game achievements and multiplayer interaction may be disabled in the recording mode. Additionally, some video games may include in-game items that are acquirable in a single-player non-recording mode which may be used in a multiplayer mode. However, whilst these items may still be acquirable in a recording mode for use in a single-player mode, they may not be used in a multiplayer mode if the items were acquired in a recording mode.

In some embodiments of the present disclosure, the method may optionally comprise a step of modifying the operation speed of the video game. In these embodiments, the editing step includes a step of modifying the playback speed of the video recording of the first run-through by the inverse of the modified operation speed of the video game during the first run-through, and a step of modifying the playback speed of the video recording of the second run-through by the inverse of the modified operation speed of the video game during the second run-through. An example is discussed below in relation to FIGS. 5A and 5B.

Figure 5A:
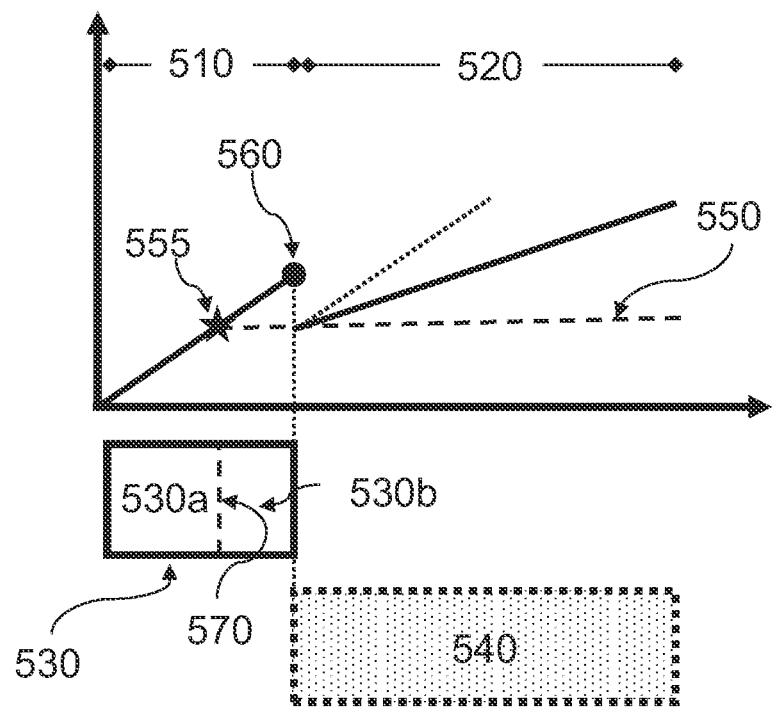
FIGS. 5A and 5B schematically illustrate an stages of a video recording method.
Figure 5B:
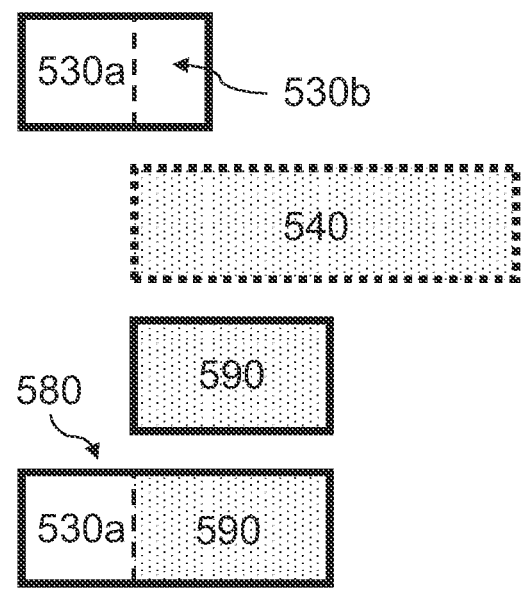

Turning now to FIGS. 5A and 5B, similarly to FIGS. 3A, 3B and 3C, where features of FIGS. 5A and 5B reflect features of other figures that are described elsewhere herein, repeated description of these features will be omitted.

FIG. 5A illustrates an example including a first run-through 510 and another run-through 520. In this example, the operation speed of the first run-through 510 is not modified. However, in some embodiments of the present disclosure, the operation speed of the first run-through 510 may be modified. After the reset 560, the operation speed of video game is modified to be half of a standard operation speed of the video game. Therefore, the operation speed during the other run-through 520 is half of the standard operation speed. FIG. 5A demonstrates the difference between the progress of the other run-through 520 at the modified operation speed, illustrated by the solid progress line after the reset 560 on the graph, and the progress of the other run-through if the operation speed of the video game was not modified, illustrated by the dotted progress line on the graph.

A representation of a video recording 540 of the other run-through 520 is shown underneath the graph in FIG. 5A. The dotted outline around the video recording 540 illustrates that playback of the video recording 540 would show the other run-through 520 at the modified operation speed. The subsequent description referring to FIGS. 5A and 5B will use the term "first video recording" when referring to the video recording 530 of the first run-through 510, and the term "second video recording" when referring to the video recording 540 of the other run-through 520.

FIG. 5B illustrates an example of an editing step applied to the first and second video recordings 530 and 540. As the operation speed of the video game was not modified during the first run-through 510, no modification is made to the playback speed of the first video recording 530. However, as the operation speed of the video game was half the standard operation speed of the video game during the second run-through 520, the playback speed of the second video recording 540 is modified by the inverse of the operation speed of the video game during the second run-through 520. In this example, the playback speed of the second video recording 540 is doubled to create a modified second video recording 590.

Subsequently, the first video recording after the detected time 530b is replaced by the modified second video recording 590 to create an edited video 580. Similarly to discussions of other examples above, as the start of the modified second video recording 590 is visually identical to the start of the first video recording from the detected time 530b, there is no visible indication in the edited video that the edited video comprises video recordings 530a and 590 of a plurality of run-throughs 510 and 520. Furthermore, as the playback speed of the second video recording 540 is modified, there is no indication that any run-through was recorded at a modified operation speed.

In some embodiments of the present disclosure, the method may optionally comprise a step of resetting the game state to the saved-game state in response to satisfying one or more predetermined reset conditions occurring during a run-through. For example, the one or more predetermined reset conditions may be any one the following conditions: a user's avatar's hit points are at or below zero, an in-game timer reaches zero, an in-game objective is failed, the user's avatar dies or is defeated, or any other suitably chosen predetermined reset condition.

In some embodiments of the present disclosure, when the method includes the above-mentioned resetting step, the method may further optionally comprise a step of presenting, prior to the game state being reset to the saved-game state and in response to the one or more predetermined reset conditions occurring during the run-through, a list of one or more game-modifier options to the user, wherein the one or more game-modifier options are customisable by the user.

For example, a user may be attempting to progress through a portion of the video game that could be more difficult than other potions of the video game. Therefore, at least one of the one or more game-modifier options may modify a difficulty parameter of the video game. For example, the quantity of hit points of the user's avatar, the quantity hit points of in-game enemies, in-game enemy artificial intelligence (AI) settings such as reaction time or detection radius, the number of in-game enemies, the strength of the user's avatar's attacks, the strength of the attacks of in-game enemies, or any other suitable difficulty parameter of the video game.

As another example, one of the one or more game-modifier options may be an option for modifying the operation speed of the video game. Therefore, the user may be able to reduce the operation speed of the video game, which may enable the user to have more time to react to events during a run-through.

Some users may also wish to create a video recording of the user playing a video game alongside a video recording of the video game. However, if the video recording of the video game is a seamless customised video recording provided by the present disclosure, the video recording of the user may comprise discontinuities that provide a visible indication that the video recording of the user comprises video recordings of a the user from a plurality of run-throughs. Therefore, it is desirable to reduce this visible indication.

Accordingly, in some embodiments of the present disclosure, a first video recording of the user may be recorded with the video recording of the first run-through and another video recording of the user may be recorded with the video recording of the other run-through. The editing step may then comprise editing the first video recording of the user by replacing the first video recording of the user, from a point corresponding to a time that the video recording of the first run-through is replaced from, with the other video recording of the user when the other run-through meets the predetermined preference criterion. These steps are similar to those discussed elsewhere herein but applied to video recordings of the user.

However, the method may further comprise a step of blending a transition between the first video recording of the user and the other video recording of the user. Therefore, the visible indication of the transition between the first video recording of the user and the other video recording of the user may be reduced.

The amount of frames the blending process may be performed over may be relative to a difference between an image frame from the first video recording of the user at the detected time and an initial image frame from the other video recording of the user. For example, if the difference is large, the number of frames the blending may be performed over may also be large.

As an example, the blending process may be performed by replacing one or more frames at the transition with a corresponding one or more transition frames. In this example, the one or more transition frames may be selected from frames in any of the video recordings of the user or from frames in a library of frames of the user from previous video recordings of the user. The transition frames may be selected according to a selection criteria, where each selected frame differs to the immediately preceding transition frame by less than a predetermined threshold, and each selected frame reduces a difference to the frame immediately following the transition compared to the difference between the immediately preceding transition frame and the frame immediately following the transition.

Optionally, the video recording of the user may have a filter applied to the transition as a part of the blending processes. For example, the filter may mimic the effect that would be seen in the video recording if the camera had lost focus during the transition, which may further mask any small discontinuities in the blended transition. From the perspective of an individual watching the video recording of the user, it may only appear to be a single continuous video recording of the user where the camera briefly loses focus. The individual watching the video recording of the user may therefore be unaware that the video recording of the user comprises a plurality of video recordings of the user.

Optionally, the method may comprise a step of displaying, prior to the game state being reset to the saved-game state, an image frame from the first video recording of the user at the detected time, wherein the game state may be reset to the saved-game state in response to a difference between a live image of the user and the displayed image frame from the first video recording of the user at the detected time being less than a predetermined reset threshold. Further optionally, the displaying step may include displaying the live image of the user.

For example, a user may wish start another run-through. In this example, prior to the game state being reset to the saved-game state, the user may see the displayed image frame from the first video recording of the user at the detected time. The user may reposition themselves in order to mimic their pose in the displayed image frame. When the difference between a live image of the user and the displayed image frame is less than a predetermined reset threshold, the game state is reset to the saved-game state and the other run-through may then begin. This technique may therefore advantageously reduce the interpolation that the blending process performs to remove visual indications of a transition.

In some embodiments of the present disclosure, a computer program is provided. The computer program comprising computer executable instructions adapted to cause a computer system to perform any of the methods described elsewhere herein.

Figure 6:
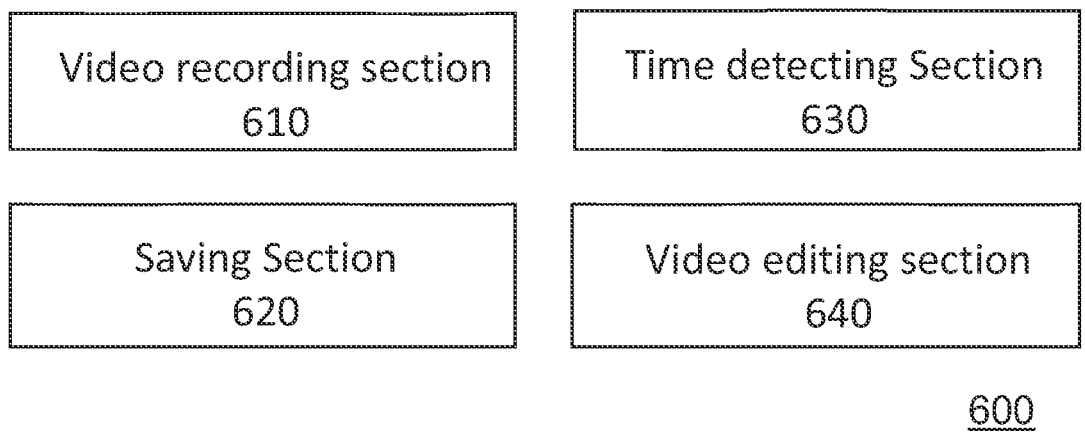
FIG. 6 schematically illustrate an example video recording system.

Turning now to FIG. 6, this figure illustrates a recording system 600 for recording a seamless customised video recording of a video game in accordance with one or more of the techniques discussed herein. The recording system comprises a video recording section 610 configured to record a video recording of a first run-through of at least a part of the video game; a saving section 620 configured to save a first game state of the video game part-way through the first run-through as a saved-game state, the saved-game state enabling a game state to be reset to the saved-game state that is at least visually identical to the first game state; a time detecting section 630 configured to detect, in response to the saving section saving the saved-game state, a time within the video recording of the first run-through corresponding to the time the saved-game state is saved; the video recording 610 section configured to record, when the game state is reset to the saved-game state, a video recording of another run-through from the saved-game state; and a video editing section 640 configured to edit the video recording of the first run-through by replacing some or all of the video recording of the first run-through recorded from the detected time with the video recording of the other run-through when the other run-through meets a predetermined preference criterion.

It will be appreciated that the above methods may be carried out on conventional hardware (such as recording system 600) suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of recording a seamless customised video recording of a video game, the method comprising the steps of:
    video recording a first run-through of at least a part of the video game;
    saving a saved-game state of a first game state of the video game part-way through the first run-through, the saved-game state enabling a game state of the video game to be reset to the saved-game state that is at least visually identical to the first game state;
    detecting, in response to the saving of the saved-game state, a time within the video recording of the first run-through corresponding to the time the saved-game state is saved;
    video recording, when the game state is reset to the saved-game state, another run-through from the saved-game state; and
    editing the video recording of the first run-through by replacing some, but not all, of the video recording of the first run-through recorded from the detected time with the video recording of the other run-through when the other run-through meets a predetermined preference criterion, such that the edited video recording of the first run-through comprises some, but not all, of the video recording of the first run-through and the video recording of the other run-through.

2. The method according to claim 1, the method comprising a step of: outputting the edited video recording.

3. The method according to claim 1, wherein the saved-game state enables the game state to be reset to the saved-game state that is identical to the first game state.

4. The method according to claim 3, wherein the step of saving the saved-game state is only accessible when the video game is run in a video recording mode.

5. The method according to claim 1, the method comprising a step of: resetting the game state to the saved-game state in response to satisfying one or more predetermined reset conditions occurring during a run-through.

6. The method according to claim 5, comprising a step of: presenting, prior to the game state being reset to the saved-game state and in response to the one or more predetermined reset conditions occurring during the run-through, a list of one or more game-modifier options to the user, wherein the one or more game-modifier options are customisable by the user.

7. The method according to claim 1, the method comprising a step of:
    modifying the operation speed of the video game, and wherein the editing step includes a step of modifying:
    the playback speed of the video recording of the first run-through by the inverse of the modified operation speed of the video game during the first run-through, and
    the playback speed of the video recording of the second run-through by the inverse of the modified operation speed of the video game during the second run-through.

8. The method according to claim 6, wherein one of the one or more game-modifier options is an option for modifying the operation speed of the video game.

9. The method according to claim 6, wherein at least one of the one or more game-modifier options modifies a difficulty parameter of the video game.

10. The method according to claim 1, wherein
    a first video recording of the user is recorded with the video recording of the first run-through and another video recording of the user is recorded with the video recording of the other run-through, wherein the editing step comprises editing the first video recording of the user by replacing the first video recording of the user, from a point corresponding to a time that the video recording of the first run-through is replaced from, with the other video recording of the user when the other run-through meets the predetermined preference criterion; and the method comprises a step of:

blending a transition between the first video recording of the user and the other video recording of the user.

11. The method according to claim 10, comprising a step of: displaying, prior to the game state being reset to the saved-game state, an image frame from the first video recording of the user at the detected time, wherein the game state is reset to the saved-game state in response to a difference between a live image of the user and the displayed image frame from the first video recording of the user at the detected time being less than a predetermined reset threshold.

12. The method according to claim 11, wherein the displaying step includes displaying the live image of the user.

13. The method according to claim 1, comprising a step of:

identifying a first frame from the video recording of the first run-through after the detected time and a second frame from the video recording of the other run-through based on a perceptual image comparison metric; and wherein the editing step comprises replacing the video recording of the first run-through on or after the first identified frame with the video recording of the other run-through on or from the second identified frame when the other run-through meets a predetermined preference criterion.

14. A non-transitory, computer readable storage medium containing a computer program comprising computer executable instructions adapted to cause a computer system to perform a method of recording a seamless customised video recording of a video game, the method comprising the steps of:

video recording a first run-through of at least a part of the video game;

saving a saved-game state of a first game state of the video game part-way through the first run-through, the saved-game state enabling a game state of the video game to be reset to the saved-game state that is at least visually identical to the first game state;

detecting, in response to the saving of the saved-game state, a time within the video recording of the first run-through corresponding to the time the saved-game state is saved;

video recording, when the game state is reset to the saved-game state, another run-through from the saved-game state; and editing the video recording of the first run-through by replacing some, but not all, of the video recording of the first run-through recorded from the detected time with the video recording of the other run-through when the other run-through meets a predetermined preference criterion, such that the edited video recording of the first run-through comprises some, but not all, of the video recording of the first run-through and the video recording of the other run-through.

15. A recording system for recording a seamless customised video recording of a video game, the recording system comprising:

a video recording section configured to record a video recording of a first run-through of at least a part of the video game;

a saving section configured to save a first game state of the video game part-way through the first run-through as a saved-game state, the saved-game state enabling a game state to be reset to the saved-game state that is at least visually identical to the first game state;

a time detecting section configured to detect, in response to the saving section saving the saved-game state, a time within the video recording of the first run-through corresponding to the time the saved-game state is saved;

the video recording section configured to record, when the game state is reset to the saved-game state, a video recording of another run-through from the saved-game state; and a video editing section configured to edit the video recording of the first run-through by replacing some, but not all, of the video recording of the first run-through recorded from the detected time with the video recording of the other run-through when the other run-through meets a predetermined preference criterion, such that the edited video recording of the first run-through comprises some, but not all, of the video recording of the first run-through and the video recording of the other run-through.

* * * * *